(12) United States Patent
Shelton et al.

(10) Patent No.: US 9,182,519 B2
(45) Date of Patent: Nov. 10, 2015

(54) METAMATERIAL COMPOSITION COMPRISING FREQUENCY-SELECTIVE-SURFACE RESONANT ELEMENT DISPOSED ON/IN A DIELECTRIC FLAKE, METHODS, AND APPLICATIONS

(75) Inventors: David Shelton, Orlando, FL (US);
Glenn Boreman, Charlotte, NC (US);
Jeffrey D'Archangel, Charlotte, NC (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 323 days.

(21) Appl. No.: 13/594,050

(22) Filed: Aug. 24, 2012

(65) Prior Publication Data
US 2013/0052463 A1    Feb. 28, 2013

Related U.S. Application Data

(60) Provisional application No. 61/527,876, filed on Aug. 26, 2011.

(51) Int. Cl.
| | |
|---|---|
| B32B 5/16 | (2006.01) |
| H01Q 21/26 | (2006.01) |
| G02B 1/00 | (2006.01) |
| G02B 5/20 | (2006.01) |
| H01Q 15/00 | (2006.01) |
| B82Y 30/00 | (2011.01) |

(52) U.S. Cl.
CPC ............... *G02B 1/002* (2013.01); *G02B 5/208* (2013.01); *H01Q 15/0086* (2013.01); *H01Q 21/26* (2013.01); *B82Y 30/00* (2013.01); *Y10T 428/2982* (2015.01)

(58) Field of Classification Search
CPC .......................... H01Q 15/0086; H01Q 21/26
USPC ........................... 428/570, 403; 343/797, 853
See application file for complete search history.

(56) References Cited

U.S. PATENT DOCUMENTS

| | | | | |
|---|---|---|---|---|
| 2002/0089462 | A1* | 7/2002 | Monzon | 343/761 |
| 2004/0140945 | A1* | 7/2004 | Werner et al. | 343/909 |
| 2007/0046558 | A1* | 3/2007 | Tillery | 343/797 |
| 2010/0141358 | A1* | 6/2010 | Akyurtlu et al. | 333/219.1 |
| 2011/0268910 | A1* | 11/2011 | Bratkovski et al. | 428/78 |
| 2012/0280872 | A1* | 11/2012 | Werner et al. | 343/753 |
| 2012/0288627 | A1* | 11/2012 | Hodges et al. | 427/265 |

OTHER PUBLICATIONS

Han et al., Composite materials with tunable chiral properties at terahertz frequencies, Chinese Optics Lett., col. 9 (suppl.), S10401, Jun. 30, 2011.*

* cited by examiner

*Primary Examiner* — Holly Le
(74) *Attorney, Agent, or Firm* — William Greener; Alek P. Szecsy; Bond, Schoeneck & King, PLLC

(57) ABSTRACT

Infrared metamaterial arrays containing Au elements immersed in a medium of benzocyclobutene (BCB) were fabricated and selectively etched to produce small square flakes with edge dimensions of approximately 20 μm. Two unit-cell designs were fabricated: one employed crossed-dipole elements while the other utilized square-loop elements.

23 Claims, 15 Drawing Sheets

Taggants in dioxolane solvent

Immediately after applying mixture b)

After allowing to dry for a few minutes c)

METAMATERIAL COMPOSITION COMPRISING FREQUENCY-SELECTIVE-SURFACE RESONANT ELEMENT DISPOSED ON/IN A DIELECTRIC FLAKE, METHODS, AND APPLICATIONS

CROSS REFERENCE TO RELATED APPLICATION

This application is related to, and derives priority from, U.S. Provisional Patent Application Ser. No. 61/527,876 filed on 26 Aug. 2011 and entitled Metamaterial Flake-based Apparatus, Methods, and Applications, the subject matter of which is fully incorporated herein by reference.

STATEMENT OF GOVERNMENT INTEREST

The research underlying the embodiments described herein was funded by the Laboratory Directed Research and Development program at Sandia National Laboratories. Sandia is a multiprogram laboratory operated by Sandia Corporation, a Lockheed Martin Company, for the United States Department of Energy's National Nuclear Security Administration under Contract DE-AC04-94AL85000. The government has certain rights in the invention.

Embodiments of the invention generally relate to the field of engineered materials, particularly to metamaterials, metamaterial compositions, methods for their making, and applications thereof, and more particularly to metamaterial flake compositions, methods for their making, and applications thereof.

Metamaterials are a class of engineered materials in which the structure, rather than the composition dominates the electromagnetic response. With resonance attributed to sub-wavelength geometry, traditional frequency selective surface (FSS) filter designs may be considered a subcategory of metamaterials.

Metamaterial structures are often fabricated on semiconductor wafers; however, this is not conducive for applications involving large area and/or non-planar surfaces such as vehicles and buildings, for example. Although the fabrication of flexible metamaterial arrays on polyimide substrates and on silicon nitride membranes has been reported, there are recognized shortcomings with this solution. They include difficulties in transporting them and applying them to surfaces. They may need to be transported in large rolls. They may need to be applied in a labor-intensive manner so as not to stretch the dimensions of the array or tear the material.

The inventors have recognized the advantages and benefits of a metamaterial-based coating that could cover non-planar surface areas, as well as methods for making such metamaterial-based coatings. The inventors believe that it would be particularly advantageous to provide a paint comprising metamaterial-based flakes containing frequency selective surface (FSS)-type resonant elements (e.g., frequency selective surface (FSS)-type resonant elements) dispersed in an IR-transparent binder.

An embodiment of the invention is a metamaterial. In an exemplary, non-limiting aspect, a metamaterial composition includes a dielectric material in the form of a flake including at least one resonant element disposed on or in the dielectric material. According to various non-limiting aspects, the metamaterial may be characterized by one or more of the following:

wherein the at least one resonant element is a unit-cell (single layer) frequency-selective surface (FSS)-type resonating element;
comprising dipole-type FSS elements, including but not limited to crossed dipoles, regular dipoles, tripoles, gangbuster-type (staggered dipole elements), dipoles with caps on their ends to provide capacitive coupling to neighboring elements, and dipoles with bent ends;
comprising loop-type FSS element including but not limited to square loops, circular loops, hexagonal loops, cross loops, and tripole loops;
comprising patch-type FSS elements (e.g., solid metal patch with similar element size and periodicity as the dipole and loop elements), including but not limited to square patch, hexagonal patch, circular patch, others as known in the art;
comprising slot-type FSS elements (i.e., continuous layer of thin films conductor including any of the above FSS types etched into the sheet to form a slot);
comprising ring-resonator metamaterial elements including but not limited to a split-ring resonator or a variation of the split-ring resonator (e.g., loop-type FSS having a gap in the loop that is about $0.01\lambda$ wide to provide capacitive coupling from the gap); the ring resonator element's self resonance is a stronger resonance than the FSS-type array effect, although both have an array effect and a self resonance;
wherein the dielectric material is transparent in a wavelength range from about 0.4 to about 14 microns, and the resonant element structure is selectively reflective in a wavelength range from about 1 to about 14 microns;
wherein the at least one resonant element is a conductive material;
wherein the at least one resonant element is at least one of gold, titanium, silver, copper, aluminum, nickel, platinum, palladium, chromium, tungsten, tantalum, niobium, vanadium, manganese, iron, or an alloy using these metals;
wherein the at least one resonant element is a degenerate (heavily doped) semiconductor;
wherein the at least one resonant element is a carbon based conductor;
wherein the at least one resonant element is graphene;
wherein the at least one resonant element further comprises a plurality of periodic arrays of unit-cell frequency-selective surface (FSS)-type resonating elements;
wherein each of the periodic arrays of unit-cell frequency-selective surface (FSS)-type resonating elements are equal to or greater than about 10 µm×10 µm;
wherein each of the periodic arrays of unit-cell frequency-selective surface (FSS)-type resonating elements are equal to or greater than about one centimeter squared (1 cm$^2$);
wherein any one of the periodic arrays of unit-cell frequency-selective surface (FSS)-type resonating elements is at least an 8×8 array of unit-cells;
wherein the unit-cell frequency-selective surface (FSS)-type resonating element is a crossed-dipole;
further comprising an immersion medium in which the at least one frequency-selective reflective element is disposed;
wherein the immersion medium is benzocyclobutene (BCB);

wherein the crossed-dipole is characterized by a fundamental resonance when the dipole length is about λ/2 in the immersion medium;
further comprising a dielectric ring on a perimeter region of each flake;
wherein the crossed-dipole is characterized by a periodicity less than λ/2 and a dipole length that is smaller than the periodicity;
wherein 400 nm≤λ≤400 μm;
wherein the unit-cell frequency-selective surface (FSS)-type resonating element is a square-loop element;
further comprising an immersion medium in which the at least one frequency-selective reflective element is disposed;
wherein the immersion medium is benzocyclobutene (BCB);
further comprising a ground plane, further wherein the at least one frequency-selective reflective element is disposed symmetrically about the ground plane;
wherein the square-loop element is characterized by a fundamental resonance when the perimeter is about 2 in the immersion medium;
wherein the square-loop element is characterized by a periodicity that is less than λ/2 and an edge length that is smaller than the periodicity;
wherein 400 nm≤λ≤400 μm.
the metamaterial further comprising a binder material;
wherein the binder is selected from the group consisting of acrylic polymer emulsion binder materials;
wherein the binder is poly(methyl methacrylate) (PMMA).

An embodiment of the invention is a method for fabricating a metamaterial. In an exemplary, non-limiting aspect, the method includes the steps of forming a release layer over a substrate; forming a blanket metamaterial layer over the release layer comprising at least one resonant conductor element supported by a dielectric material layer; patterning the blanket metamaterial layer to provide a metamaterial flake comprising the at least one resonant conductor element supported by a patterned dielectric material layer; and treating the release layer to release the metamaterial flake from the substrate. According to various non-limiting aspects, the method may be characterized by one or more of the following features or steps:
wherein the substrate comprises a standard size semiconductor-suitable substrate;
wherein the release layer comprises at least one of a silicon oxide (SiO$_2$) material, a silicon nitride (SiN) material, a silicon oxynitride (SiO$_x$N$_y$) material, and a polymer; and the treating step comprises dissolving the release layer using a suitable etchant such as, but not limited to a buffered oxide for SiO$_2$, an organic solvent for a polymer sacrificial layer, and a phosphoric acid for SiO$_x$N$_y$;
wherein the forming the blanket metamaterial layer step provides at least one crossed dipole resonant conductor element supported by the dielectric material layer;
wherein the forming the blanket metamaterial layer step provides at least one square loop resonant conductor element supported by the dielectric material layer;
wherein the patterning uses an anisotropic etchant, and the treating uses an isotropic etchant.

The objects, features and advantages of the embodiments are understood within the context of the Detailed Description of the Embodiments, as set forth below. The detailed description of non-limiting, exemplary embodiments, which follows below, will be understood within the context of the accompanying drawings, which form a material part of this disclosure, wherein.

Figure 12:
Figure 12:
Figure 12:
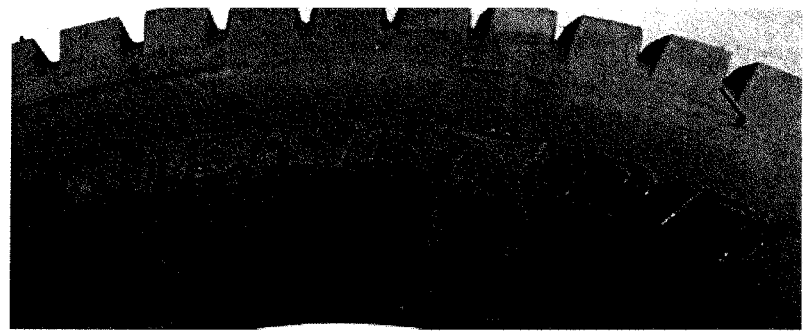
Figure 13:
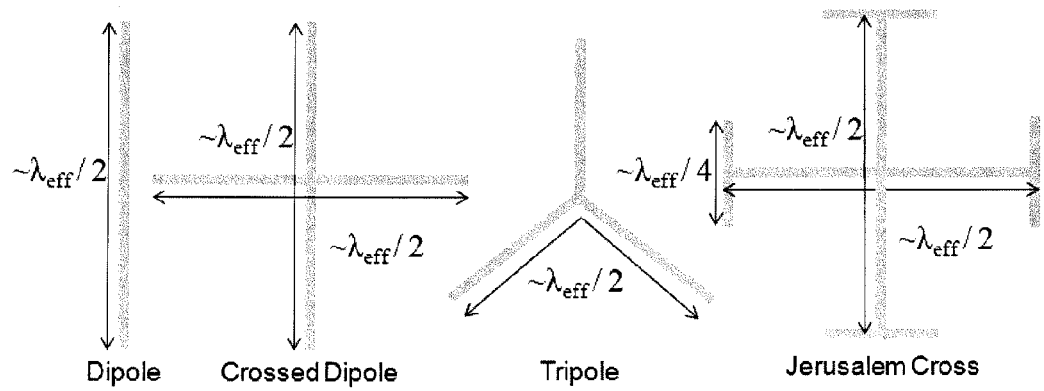
Figure 14:
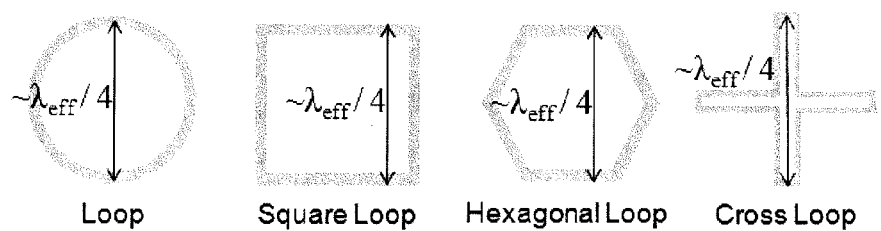
Figure 15:
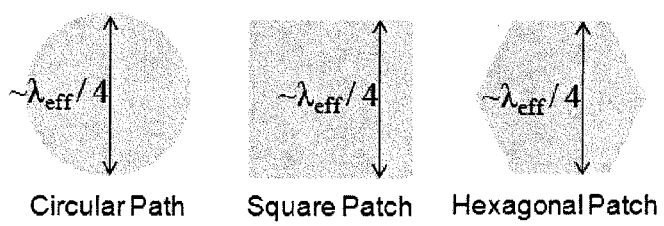
Figure 16:
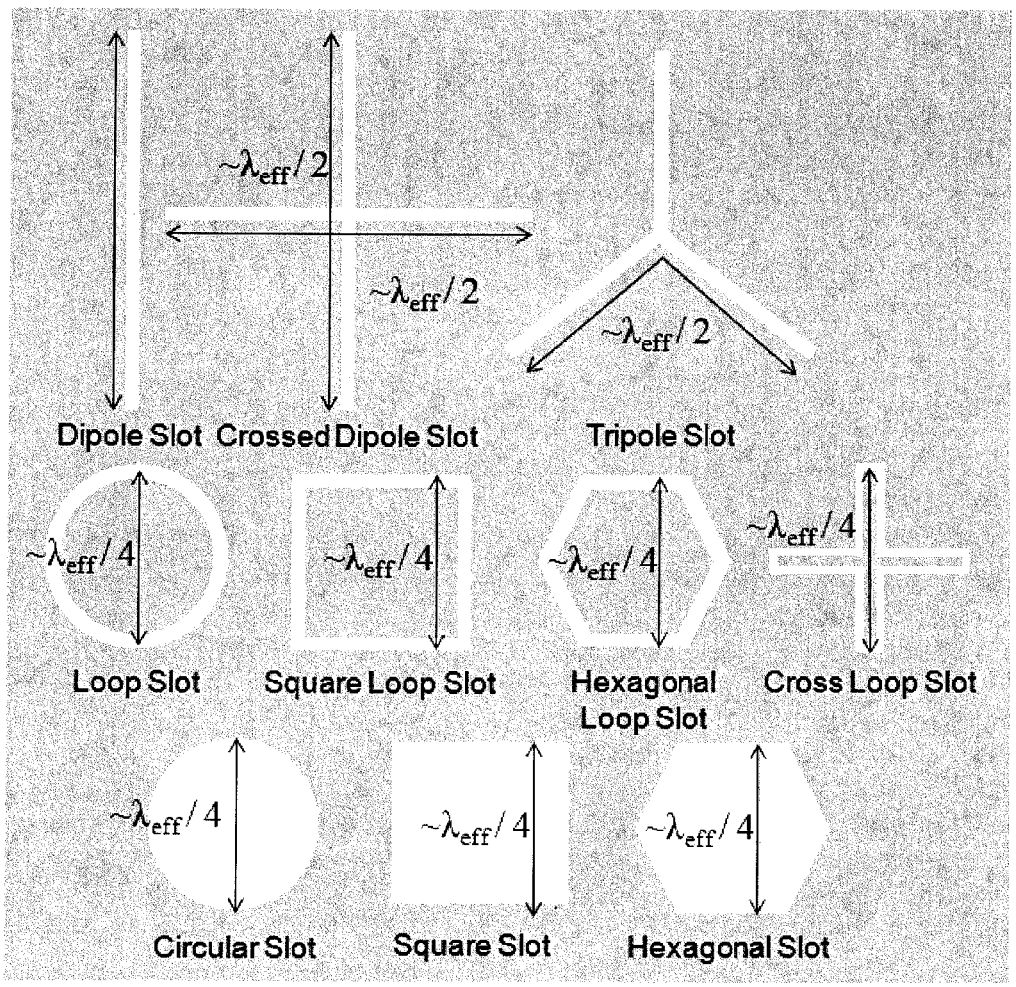
Figure 17:
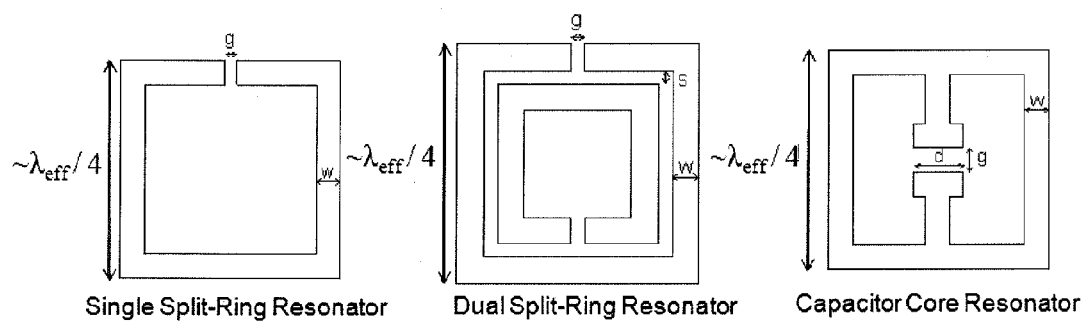

FIG. 12*a* is a photocopy showing taggants in a dioxolane solvent; FIG. 12*b* is a photocopy showing a non-planar rubber surface immediately after applying the mixture; FIG. 12*c* is a photocopy showing the non-planar rubber surface in FIG. 12*b* after the mixture was allowed to dry for several minutes, according to illustrative aspects of the invention;

FIG. 13 schematically illustrates several alternative dipole-type FSS elements, according to illustrative aspects of the invention;

FIG. 14 schematically illustrates several alternative loop-type FSS elements, according to illustrative aspects of the invention;

FIG. 15 schematically illustrates several alternative patch-type FSS elements, according to illustrative aspects of the invention;

FIG. 16 schematically illustrates several alternative slot-type FSS elements, according to illustrative aspects of the invention;

FIG. 17 schematically illustrates several alternative ring-resonator metamaterial elements, according to illustrative aspects of the invention.

The disclosed non-limiting and exemplary embodiments and aspects of the invention describe the design, fabrication, and testing of metamaterial-based flake compositions containing multiple unit cells of resonant elements. Such particles may be dispersed in an IR-transparent binder making them suitable for implementation in a paint. A coating such as this would contain a random placement of flakes, since they could be disposed on either side and in any rotational orientation. As such, the unit-cell design of the metamaterial will advantageously be symmetric about the center plane of the flakes and have spectral characteristics that are invariant to in-plane rotations.

Unit-Cell Design and Modeling

The design and modeling of the embodied metamaterial flakes began with a unit cell (or, a single resonant element). Our simulations assumed a periodic and infinite lattice of unit cells, while the fabricated result was a collection of finite periodic arrays of unit cell elements. The resonant behavior of such arrays were not expected be critically impacted by the finite extent of passive arrays for situations where on the order of 10 by 10 unit cells are contiguous. The measured strength of the resonance, however, was affected due to the diminished proportion of flakes in the observation area. Thus, the spectral features of an infinite array of unit cells served as the baseline for comparison with the measured response of the collected flakes.

Figure 3:
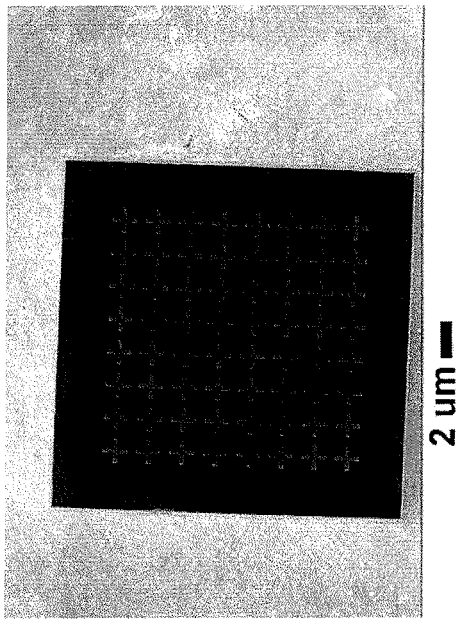
FIG. 3 shows a SEM micrograph of a single crossed-dipole flake, according to a non-limiting, illustrative embodiment of the invention.

A first illustrative metamaterial flake 300 is an 8 by 8 array of crossed dipoles, with a unit-cell periodicity of 1.8 μm and a dipole length of 1.4 μm, as shown in FIG. 3. The crossed dipole flake was designed to have a fundamental resonance when the dipole length is approximately $\lambda/2$ in an immersion medium of benzocyclobutene (BCB). This design incorporated a guard ring (ring of dielectric without elements) 310 on the perimeter of each flake. The purpose of the guard ring was to create a final structure with the elements fully encased in BCB.

Figure 4:
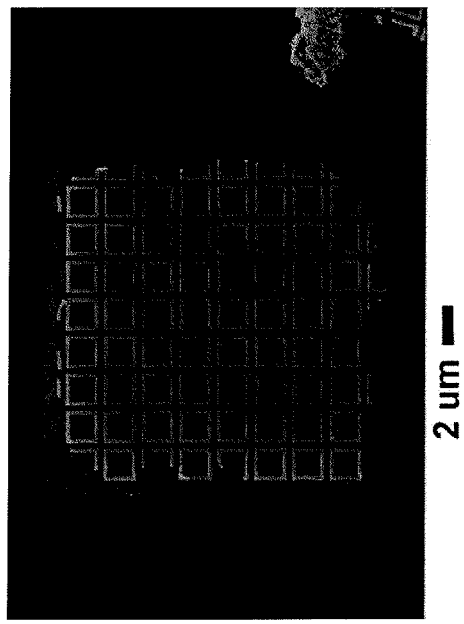
FIG. 4 shows a SEM micrograph of single square-loop flake, according to a non-limiting, illustrative embodiment of the invention.

A second metamaterial flake 400 is an 8 by 8 array of square loop elements, with a periodicity of 2 μm and edges 1.7 μm long, as shown in FIG. 4. The fundamental resonance of the square-loop occurs when the perimeter is approximately $\lambda$ in the immersion medium. The square-loop design generally has a broader resonance as compared to the crossed-dipole design, due to the decreased inter-element spacing. The square loop design is symmetric about a Cr ground plane (216, FIG. 2) with a 0.5 μm resonant cavity of BCB, and contained no guard ring. The ground plane was made thick enough such that the wavelengths of interest were significantly attenuated (and thus nearly completely reflected). In the resonant cavity, the BCB layer represents a quarter wave layer in the material, thus enhancing the resonance of the array via thin film interference. The overlayer of BCB served merely to protect the elements from processing and thus was made as thin as our process would allow.

Modeling was carried out in Ansoft High Frequency Structure Simulator (HFSS). HFSS computes the electrical behavior of high-frequency structures using finite element analysis. The results of HFSS assume an infinite array of unit cells and plane wave illumination at a single angle of incidence. The modeling relied on user input geometry and frequency dependent optical material properties derived from ellipsometry, which greatly increases confidence in the simulation since optical properties and film thickness can be measured directly after each fabrication step and input into the simulation. This is especially critical in the infrared, due to the finite conductivity of metals. For the crossed-dipole design, the unit cell was simulated on a Si wafer (its environment after collection). The unit-cell simulation for the square-loop design only required the upper half of the flake, as the Cr ground plane was assumed to be a perfect electrical conductor.

Fabrication and Testing

Figure 11:
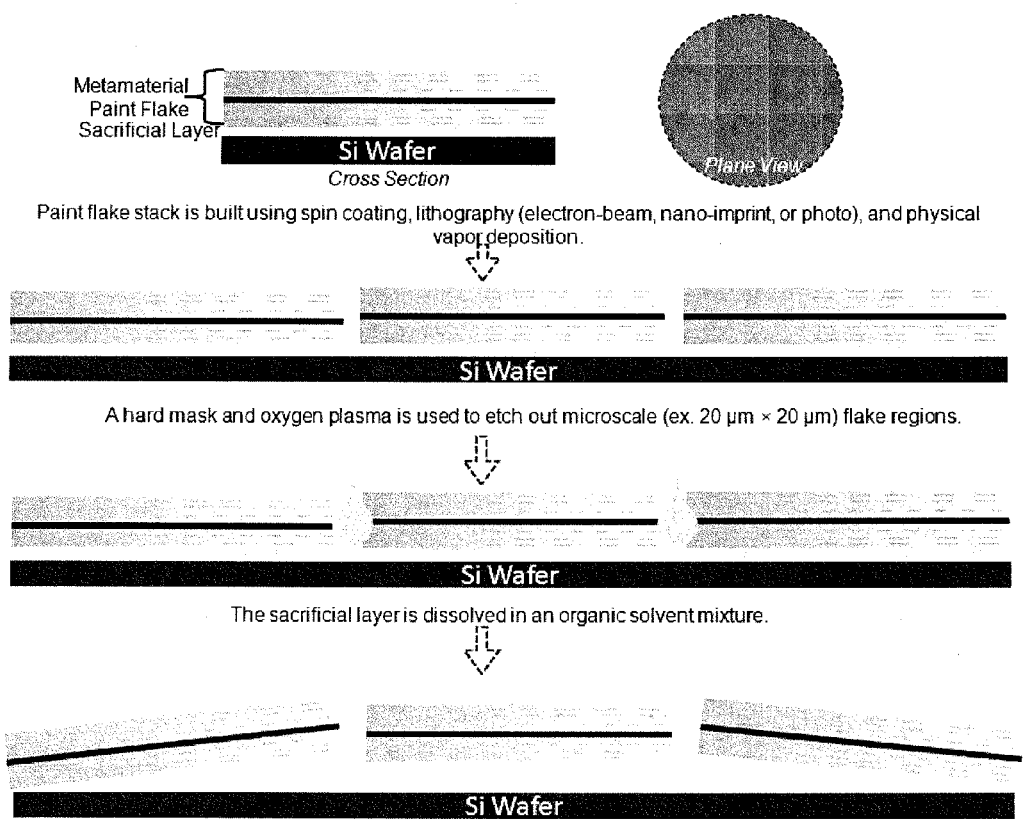
FIG. 11 is a schematic diagram of a process according to an exemplary embodiment of the invention.

The flakes were fabricated on silicon wafers, then etched to define the flakes out of the stack of thin films on the wafer, and stripped off of the silicon wafer. A sacrificial layer such as silicon dioxide or a polymer layer lies continuously beneath the flake stacks. When the flake stack is immersed in a solvent that dissolves the sacrificial layer the flakes float off of the silicon wafer and float freely in the solvent. This solvent may be a buffered oxide etch for a silicon dioxide sacrificial layer, or it may be an organic solvent for a polymer sacrificial layer. The sacrificial layer is selected so that lithographic processing of the metamaterial elements does not chemically attack the sacrificial layer, and the solvent that removes the sacrificial layer does not chemically attack the flakes themselves. FIG. 11 schematically illustrates an exemplary process.

NON-LIMITING EXAMPLES

Figure 1:
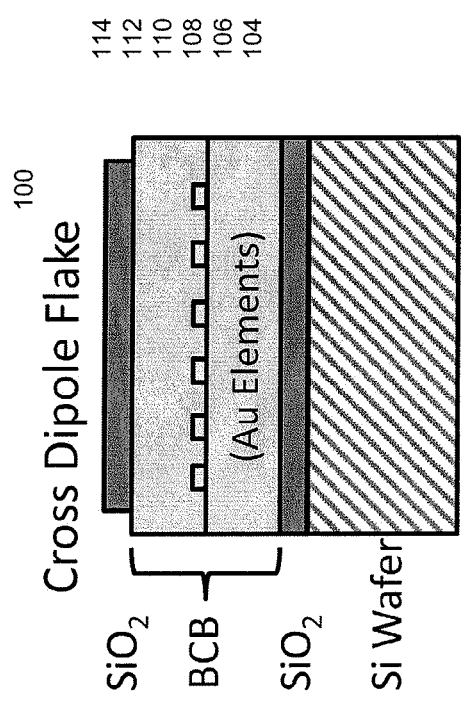
FIG. 1 shows a cross-sectional schematic of a fabricated crossed-dipole flake including a wafer substrate, SiO2 sacrificial layer and etch mask, and Au elements encased in BCB, according to a non-limiting, illustrative embodiment of the invention.

Large rectangular arrays (~1 cm$^2$) of unit cells were fabricated on a Si wafer. The arrays were sandwiched in-between a sacrificial layer and an etch mask of SiO$_2$ to facilitate later processing. A side view of the fabrication design for a crossed-dipole flake 100 is shown in FIG. 1. A 150 nm layer 106 of SiO$_2$ was deposited via electron beam evaporation upon a clean Si wafer 104. A 250 nm layer 108 of BCB was added via spin coating. Gold (Au) crossed-dipole elements 110 (75-nm thick) were added by electron-beam lithography and lift-off. In this step, Au alignment marks were added for later alignment of the etch mask. A second 250 nm coating 112 of BCB was applied. This was followed by a SiO$_2$ etch mask 114 patterned by electron beam lithography and liftoff.

Figure 2:
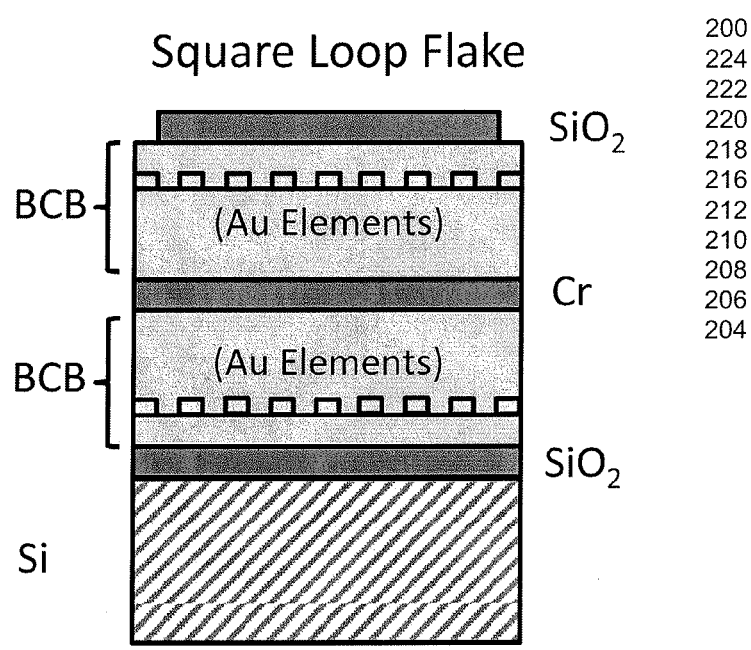
FIG. 2 shows a cross-sectional schematic of a fabricated square-loop flake including a wafer substrate, SiO2 sacrificial layer and etch mask, and two sets of Au elements incased in BCB separated by a Cr ground plane, according to a non-limiting, illustrative embodiment of the invention.

The fabrication design for a square-loop element 200 symmetric about a ground plane is shown in FIG. 2. A sacrificial layer 206 of 150 nm SiO$_2$ was deposited upon a clean Si wafer 204. A first layer 208 of 125 nm BCB was added by spin coating and followed by a first set 210 of 75 nm thick Au square-loop elements created by electron beam lithography and lift-off. A second coating 212 (575 nm) of BCB was then applied. A 150 nm Cr ground plane 216 was added by electron beam evaporation. A third layer 218 of 500 nm BCB was added, followed by another layer 220 of Au elements. After this, a final 200 nm layer 222 of BCB was applied. An etch mask 224 of 150 nm thick SiO$_2$ was patterned by electron beam lithography.

For both designs, Au elements were fabricated by direct-write electron beam lithography and liftoff. We used ZEP 520A-7 resist, which was cured for three minutes at 180° C. The lithography was performed on a Leica EBPG5000+ electron beam lithography system. The resonant elements had line widths of 200 nm and 300 nm (square-loop and crossed-dipole, respectively), although the system is capable of finer resolution, e.g., down to 10 nm. After exposure, the sample was developed in ZEP-RD for 90 seconds. Au elements were deposited by electron beam evaporation (a Ti adhesion layer was included before and after each Au deposition). Lift-off was performed in ZEP-remover (N,N-dimethylacetamide) under ultrasonic agitation. The SiO$_2$ sacrificial layer and etch mask were fabricated using the same equipment and processes as the Au elements. The BCB polymer was CYCLO-TENE 3022-35 (Dow Chemical Company). Although it exhibits absorption in the 8 μm-13 μm range, BCB is relatively transparent over the wide range of interest. BCB was applied by spin coating and then hard-cured at 250° C. for 5 minutes on a hot plate in an inert environment. The fabrication required various thicknesses of BCB. These were realized by mixing BCB with its thinner (mesitylene), and, to a lesser extent, changing the speeds of the spin coater. The thickness of BCB was determined with a J. A. Woollam IR-VASE ellipsometer.

The dimensions of the flakes were defined by the $SiO_2$ etch mask. The first plasma-etch cut through the openings of the etch mask and removed unwanted material down to the ground plane. Next, a wet etch in CHROME ETCH (Ashland Specialty Chemical Company) was used to etch through the Cr ground plane. The final plasma-etch cut through the bottom layer of BCB. The plasma etching took place in a Branson P2000 barrel etcher. Etching BCB in this manner requires an introduction of fluorinated gas into the $O_2$ environment, as $O_2$ plasma alone is known to lead to a self-passivating etch process. We found that a combination of $CF_4$ and $O_2$ that was roughly 1:3 led to etch rates of approximately 150 nm per minute at 200 W.

The flakes were released from the substrate in a buffered-oxide etch (BOE), which is known to selectively etch $SiO_2$. The flakes were released within a few minutes in BOE under ultrasonic agitation, which also removed remaining portions of the etch mask. We found that in the limit of exposure in our experiment, the BOE did not significantly attack the BCB or the Cr. To stop the etching process and collect the flakes, we used a nylon filter screen attached to the end of a syringe. The openings in the filter screen were 11 µm square, roughly half of the intended flake size. The collection of flakes on the filter media were transferred onto a clean Si wafer for observation and testing. The resulting sample was momentarily placed on a 180° C. hot plate to evaporate any remaining BOE. In all observations and measurements, the flakes were merely clinging to the wafer, held slightly by what is believed to be a result of their initially wet application.

The physical results of the fabrication were observed by both optical microscopy and scanning electron microscopy using an Olympus optical microscope and a Zeiss Ultra-55 scanning electron microscope (SEM). Since the Au metamaterial elements were encased in dielectric, SEM imaging produced images with good contrast. Spectral reflectivity measurements were taken of the collected flakes and also the full array before etching using a Perkin-Elmer micro-FTIR spectrometer with an input diameter of 100 µm and a full angle field of view of 28°.

In an alternative, exemplary aspect, we spin coated a polymer sacrificial layer of polyaliphatic imide copolymer onto the silicon wafer. The copolymer was suspended in cyclopentanone (65-85%) and tetrahydrofurfuryl (10-15%) solvent solution, which is available as NANO PMGI SF series resist. The stripping solvent was a solution of dioxolane (70-80%) and propylene glycol monomethyl ether (20-30%), available as EBR PG edge bead remover.

It will be appreciated that the embodied invention is not limited to the illustrative crossed dipole and square loop resonant element structures types described hereinabove. FIGS. 13-17 schematically illustrate other exemplary resonant element structure types.

FIG. 13 schematically illustrates several alternative dipole-type FSS elements. They include regular dipoles, crossed dipoles, tripoles, gangbuster-type (staggered dipole elements), dipoles with caps on their ends to provide capacitive coupling to neighboring elements, and dipoles with bent ends.

FIG. 14 schematically illustrates several alternative loop-type FSS elements. They include square loops, circular loops, hexagonal loops, cross loops, and tripole loops.

FIG. 15 schematically illustrates several alternative patch-type FSS elements. They include a solid metal patch with similar element size and periodicity as the dipole and loop elements, square patch, hexagonal patch, circular patch, and others known in the art.

FIG. 16 schematically illustrates several alternative slot-type FSS elements. These are formed by a continuous layer of thin films conductor and any of the above FSS types etched into the sheet to form a slot. Slotted FSS have conjugate performance compared to the dipole, loop, or patch versions.

FIG. 17 schematically illustrates several alternative ring-resonator metamaterial elements. These include a split-ring resonator or some variation of the split-ring resonator. These are formed from a loop-type FSS by adding a gap that is about 0.01, wide to the loop to get capacitive coupling from the gap. Now, the element's self resonance is a stronger resonance than the array effect. FSS type elements rely more on an array effect, although both have an array effect and a self resonance.

In each of these embodied aspects, the variable $\lambda_{eff}$ is the effective wavelength, which depends upon the permittivity of dielectric surrounding the element. The exact value of the effective wavelength depends upon the design, but it typically ranges from $\lambda/10$ to $\lambda/2$ where $\lambda$ is the free space wavelength. When these elements are arrayed as a frequency selective surface the periodicity is typically such that the space between elements is as small as $0.01\lambda$ and can be as large as $\lambda/2$. The wires that make up the elements typically have widths to scale with the figures, but this can be varied greatly depending upon the design. All of these element types may be fabricated using the same lithographic techniques, and are all well suited for use in metamaterial flakes.

Results

The fabricated samples for each flake scheme closely matched our intended designs. FIGS. 3 and 4, respectively, are SEM images of single-flake examples of the crossed-dipole 300 and square-loop 400 designs. The guard ring 310 contributed to a much cleaner fabrication process, as the presence of elements and the ground plane in between the flakes complicated the BCB removal. The faint perimeter line in FIG. 3 shows a small etch bias from the isotropic plasma etch.

Figure 5:
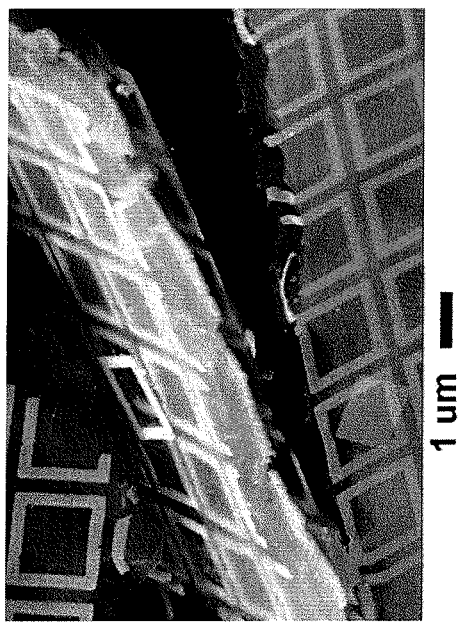
FIG. 5 shows a SEM micrograph of the edge of a square-loop flake, showing the Au elements, BCB cavity, and Cr ground plane, according to a non-limiting, illustrative aspect of the invention.

FIG. 5 is an SEM image showing the cross section of a square loop-flake (e.g., 400, FIG. 4). The resonant cavity, elements, and cladding layer (the bright contrast region in the middle of the flake between the square loop elements) on either side of the Cr ground plane are visible.

Figure 6:
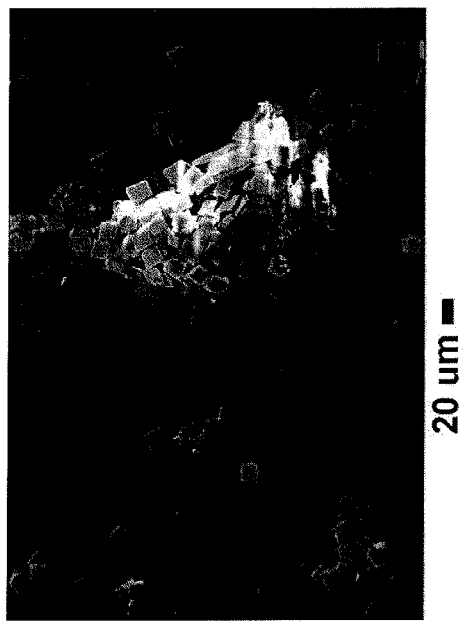
FIG. 6 shows a SEM micrograph showing a large collection of metamaterial flakes according to a non-limiting, illustrative aspect of the invention. The whitish haze is from charging in the dielectric layer.
Figure 7:
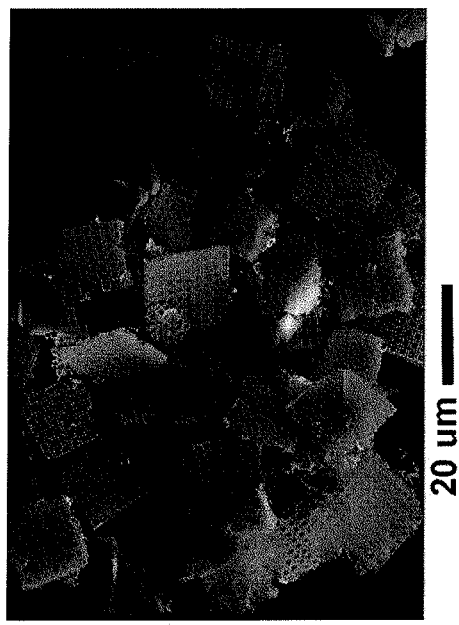
FIG. 7 shows a SEM micrograph of an area of square loop-flakes representing the typical sample size for FTIR measurements, showing an assortment of rotational and azimuthal orientations, according to a non-limiting, illustrative aspect of the invention.

We measured wavelength-dependent reflectivity in areas with high concentrations of flakes, such as those seen in FIGS. 6 and 7. FIG. 6 shows a typical assortment of many flakes, while FIG. 7 shows the flakes on a scale close to that of the FTIR input aperture (10 µm diameter). The flakes tend to lie flat on the collection wafer unless they overlap; from the SEM images, we estimate that the majority of the flakes are oriented within ±15° from normal incidence. A crude estimate of the spatial fill factor of the flakes in the measurement area can be made by placing a grid over the figure to compare the flake filled sections to the voids. For FIG. 7, this yields a fill factor of approximately 65%. In FIG. 7, one can also see that a design without a guard ring results in jagged edges and some left over Au elements, since Au is not affected by the $CF_4:O_2$ plasma etch.

Figure 8:
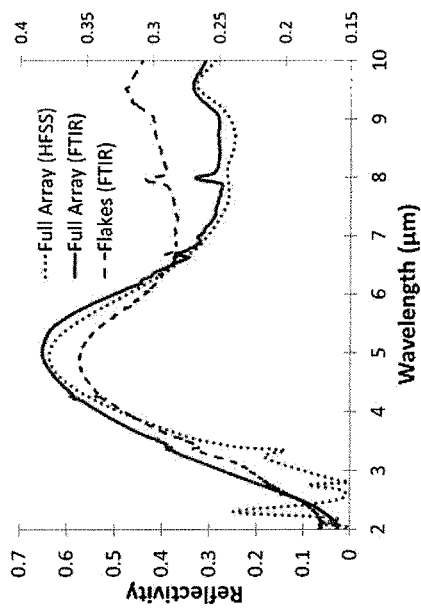
FIG. 8 is a graph showing the measured reflectivity of crossed-dipole flakes (plotted on right axis) compared with the measured and simulated reflectivity of the full array (plotted on left axis), according to a non-limiting, illustrative aspect of the invention.

FIG. 8 is a graph showing a comparison between the reflectivity of collected crossed-dipole flakes to that of the full array of unit cells still on the wafer and also that which was predicted by our HFSS model (the reflectivity of the flakes is plotted on the right axis). As seen in FIG. 7, the flakes are not completely filling the input aperture of the FTIR. Additionally, the guard ring reduced the number of elements per flake, decreasing the fill factor even further. Still, the reflectivity of the flakes successfully matches the shape and modulation of the full array and simulation.

Figure 9:
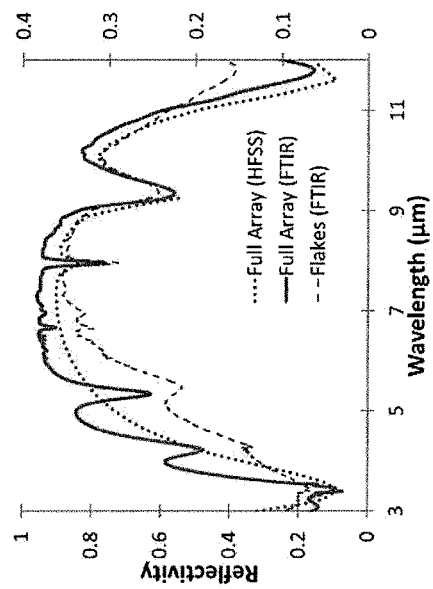
FIG. 9 is a graph showing the measured reflectivity of square-loop flakes (plotted on right axis) compared with the measured and simulated reflectivity of the full array (plotted on left axis), according to a non-limiting, illustrative aspect of the invention.

FIG. 9 is a graph showing a comparison between the reflectivity spectra of the collected square-loop flakes to the reflectivity spectra of the full array and the reflectivity predicted by the simulation. We note again that the full array data are plotted on the left axis while the flake data are plotted on the right axis. The fill factor of our flake coating has weakened the reflectivity amplitude, while the shape of the reflectivity features has been maintained. The bands near 8 μm and 9.5 μm appearing in all three data sets are due to absorption peaks in the BCB.

Figure 10:
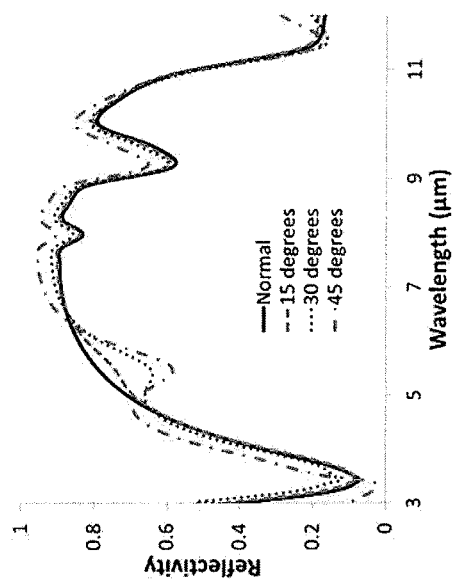
FIG. 10 is a graph showing the simulated reflectivity of a full array of square-loop flakes for normal incidence, 15°, 30°, and 45°, according to a non-limiting, illustrative aspect of the invention.

FIG. 10 is a graph that shows the simulated reflectivity of an infinite array of square-loop elements with respect to angle of incidence. The simulations show that the strength of resonance and modulation vary only slightly from normal incidence through 30°. Major deviations of the reflectivity do not occur until 45°. Comparing FIG. 10 to FIG. 9, we infer that differences between simulated and flake reflectivity are not primarily due to the random angle of incidence of the flakes; it is more likely that any changes in spectral behavior are caused by a combination of fill factor of the measurement and the finite array dimension of the flakes.

Non-Limiting, Exemplary Applications

It may be advantageous to disperse the metamaterial flakes in an IR-transparent binder to form, e.g., a paint for application of the metamaterial composition on a surface that may have an irregular topology. The solvent that the flakes are originally transferred into can be allowed to evaporate to make the flake mixture denser. A surfactants can advantageously be added to the solvent to prevent the flakes from sticking together, although commercially available solvents appear to have sufficient surfactant concentrations to prevent flakes from sticking together, which is more problematic with a buffered oxide etch. Exemplary IR-transparent binders include but are not limited to poly(methyl methacrylate) (PMMA) or an acrylic polymer emulsion.

We note also that no binder may be required. The flake mixture may be dispensed onto a surface in the solvent. The solvent will evaporate rapidly (e.g., 10 times faster than water for embodied dioxolane based solvents), leaving just the flakes behind, which adhere to the surface due to static electricity forces or stiction. FIG. 12a is a photocopy showing taggants in a dioxolane solvent; FIG. 12b is a photocopy showing a non-planar rubber surface immediately after applying the mixture; FIG. 12c is a photocopy showing the non-planar rubber surface in FIG. 12b after the mixture was allowed to dry for several minutes. Note that this application is not limited to a rubber surface; rather, any number of surfaces would be suitable for such application as one skilled in the art would understand.

All references, including publications, patent applications, and patents cited herein are hereby incorporated by reference in their entireties to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

We claim:

1. A metamaterial composition, comprising:
   a dielectric material in the form of a flake including at least one resonant element structure disposed thereon or therein, wherein the at least one resonant element is:
      a unit-cell frequency-selective surface (FSS)-type resonating element;
      a conductive material;
      selected from a group consisting of one of gold, titanium, silver, copper, aluminum, nickel, platinum, palladium, chromium, tungsten, tantalum, niobium, vanadium, manganese, iron, an alloy of any thereof; a degenerate semiconductor; a carbon based conductor;
      a crossed-dipole,
   a first immersion medium layer in which the at least one resonant element is disposed, wherein the immersion medium is benzocyclobutene (BCB), and
   a second layer of benzocyclobutene (BCB) disposed over the at least one resonant element.

2. The metamaterial of claim 1, wherein the dielectric material is transparent in a wavelength range from about 0.4 to about 14 microns, and the resonant element structure is selectively reflective in a wavelength range from about 1 to about 14 microns.

3. The metamaterial of claim 1, wherein the carbon based conductor is graphene.

4. The metamaterial of claim 1, wherein the at least one resonant element structure further comprises a plurality of periodic arrays of unit-cell resonating elements.

5. The metamaterial of claim 4, wherein each of the periodic arrays of unit-cell resonating elements are equal to or greater than about 10 μm×10 μm.

6. The metamaterial of claim 4, wherein each of the periodic arrays of unit-cell resonating elements are equal to or greater than about one centimeter squared (1 cm$^2$).

7. The metamaterial of claim 4, wherein any one of the periodic arrays of unit-cell frequency-selective surface (FSS)-type resonating elements is at least an 8×8 array of unit-cells.

8. The metamaterial of claim 1, wherein the crossed-dipole is characterized by a fundamental resonance when the dipole length is about $\lambda/2$ in the immersion medium.

9. The metamaterial of claim 1, wherein the crossed-dipole is characterized by a periodicity less than $\lambda/2$ and a dipole length that is smaller than the periodicity.

10. The metamaterial of claim 9, wherein 400 nm≤$\lambda$≤400 µm.

11. The metamaterial of claim 10, further comprising a dielectric ring on a perimeter region of each flake.

12. The metamaterial of claim 1, wherein the flake shape has in-plane lateral dimensions from about 10 to about 100 microns and a thickness dimension from about 2 to about 10 microns.

13. The metamaterial of claim 1, further comprising a binder material.

14. The metamaterial of claim 13, wherein the binder is selected from the group consisting of acrylic polymer emulsion binder materials.

15. The metamaterial of claim 13, wherein the binder is poly(methyl methacrylate) (PMMA).

16. The metamaterial of claim 1, further comprising a SiO$_2$ layer disposed over the second layer of benzocyclobutene (BCB).

17. The metamaterial of claim 1, further comprising a SiO$_2$ layer disposed under the first layer of benzocyclobutene (BCB).

18. A metamaterial composition, comprising:
 a dielectric material in the form of a flake including at least first and second resonant element structures disposed thereon or therein, wherein each of the first and second resonant elements are:
  a unit-cell frequency-selective surface (FSS)-type resonating element;
  a conductive material;
  selected from a group consisting of one of gold, titanium, silver, copper, aluminum, nickel, platinum, palladium, chromium, tungsten, tantalum, niobium, vanadium, manganese, iron, an alloy of any thereof; a degenerate semiconductor; a carbon based conductor; a square-loop element,
 a first immersion medium layer in which the at least first resonant element is disposed, wherein the immersion medium is benzocyclobutene (BCB),
 a second layer of benzocyclobutene (BCB) in which the second resonant element is disposed,
 a third layer of benzocyclobutene (BCB) disposed over the at least first resonant element,
 a fourth layer of benzocyclobutene (BCB) disposed over the at least first resonant element, and
 a ground plane positioned between the third layer of benzocyclobutene (BCB) and the second layer of benzocyclobutene (BCB).

19. The metamaterial of claim 18, wherein the square-loop element is characterized by a fundamental resonance when the perimeter is about $\lambda$ in the immersion medium.

20. The metamaterial of claim 18, further comprising a SiO$_2$ layer disposed under the first layer of benzocyclobutene (BCB).

21. The metamaterial of claim 20, further comprising a SiO$_2$ layer disposed over the fourth layer of benzocyclobutene (BCB).

22. The metamaterial of claim 18, wherein the carbon based conductor is graphene.

23. The metamaterial of claim 18, wherein the dielectric material is transparent in a wavelength range from about 0.4 to about 14 microns, and the resonant element structure is selectively reflective in a wavelength range from about 1 to about 14 microns.

* * * * *